Sept. 15, 1959    J. MODIN    2,903,853
HYDRAULIC TRANSMISSIONS
Filed Sept. 17, 1957    3 Sheets-Sheet 1

INVENTOR
JOHN MODIN
*Ernest F. Carver*
ATTORNEY

Sept. 15, 1959  J. MODIN  2,903,853
HYDRAULIC TRANSMISSIONS
Filed Sept. 17, 1957  3 Sheets-Sheet 2

INVENTOR
JOHN MODIN
ATTORNEY

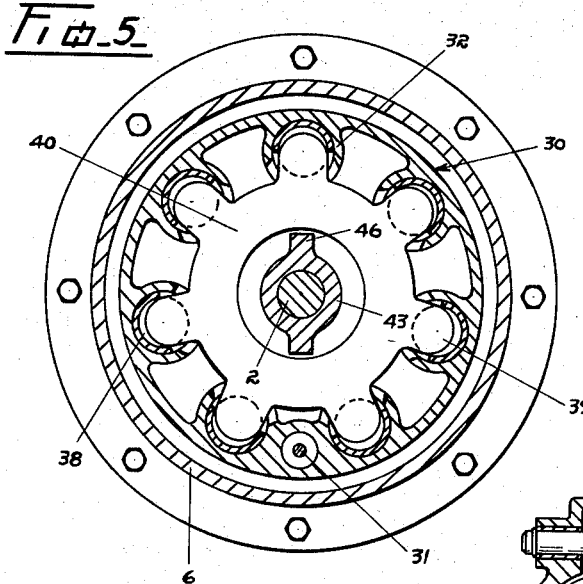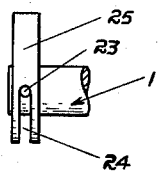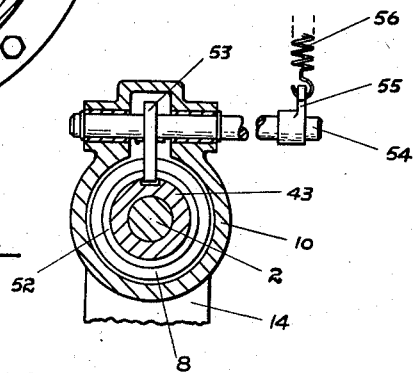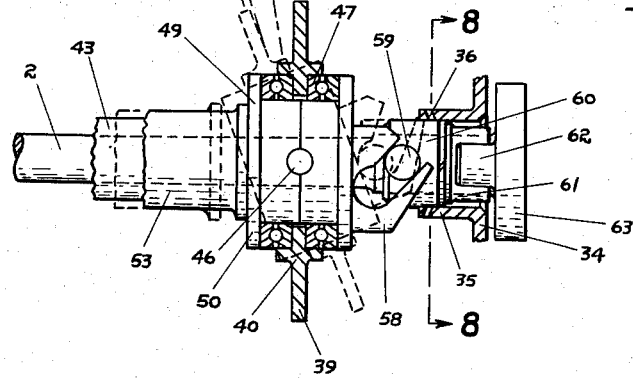
INVENTOR
JOHN MODIN
ATTORNEY

United States Patent Office 2,903,853
Patented Sept. 15, 1959

2,903,853

HYDRAULIC TRANSMISSIONS

John Modin, Vancouver, British Columbia, Canada

Application September 17, 1957, Serial No. 684,468

9 Claims. (Cl. 60—53)

My invention relates to improvements in hydraulic transmissions.

The object of the invention is to provide a hydraulic transmission which is automatic in operation and particularly suitable for use in motor driven vehicles.

An object of the invention is to provide a couple between the accelerator of the vehicle and the transmission, whereby the vehicle will remain at rest until acceleration takes place. Another object is to provide that as manual deceleration is resorted to the transmission will automatically set up a braking effect on the vehicle.

The transmission provides that when the device is running at one to one ratio a hydraulic lock is brought about in the transmission and the oil flowing normally between different parts of the transmission ceases, consequently no heat is generated in the oil and the drive becomes substantially direct from the input to the output shaft.

Other objects will appear as the specification proceeds.

Referring to the accompanying drawings:

Figure 5 is a section taken on the line 5—5 of Figure 1.

Figure 6 is a section taken on the line 6—6 of Figure 1.

Figure 7 is a plan view part in section, showing the wobble plate and associated parts of the motor.

Figure 10 is a side elevation of the eccentric normally driven by the input shaft.

In the drawings like characters of reference indicate corresponding parts in each figure.

The numeral 1 indicates generally an input shaft to which a prime mover, such as an internal combustion engine or otherwise, is directly connected and 2 is an output or driven shaft which is adapted for connection to the propeller shaft of the vehicle through a selector train of gears designed to give either forward or reverse drive, such train of gears not being shown.

Figure 1:
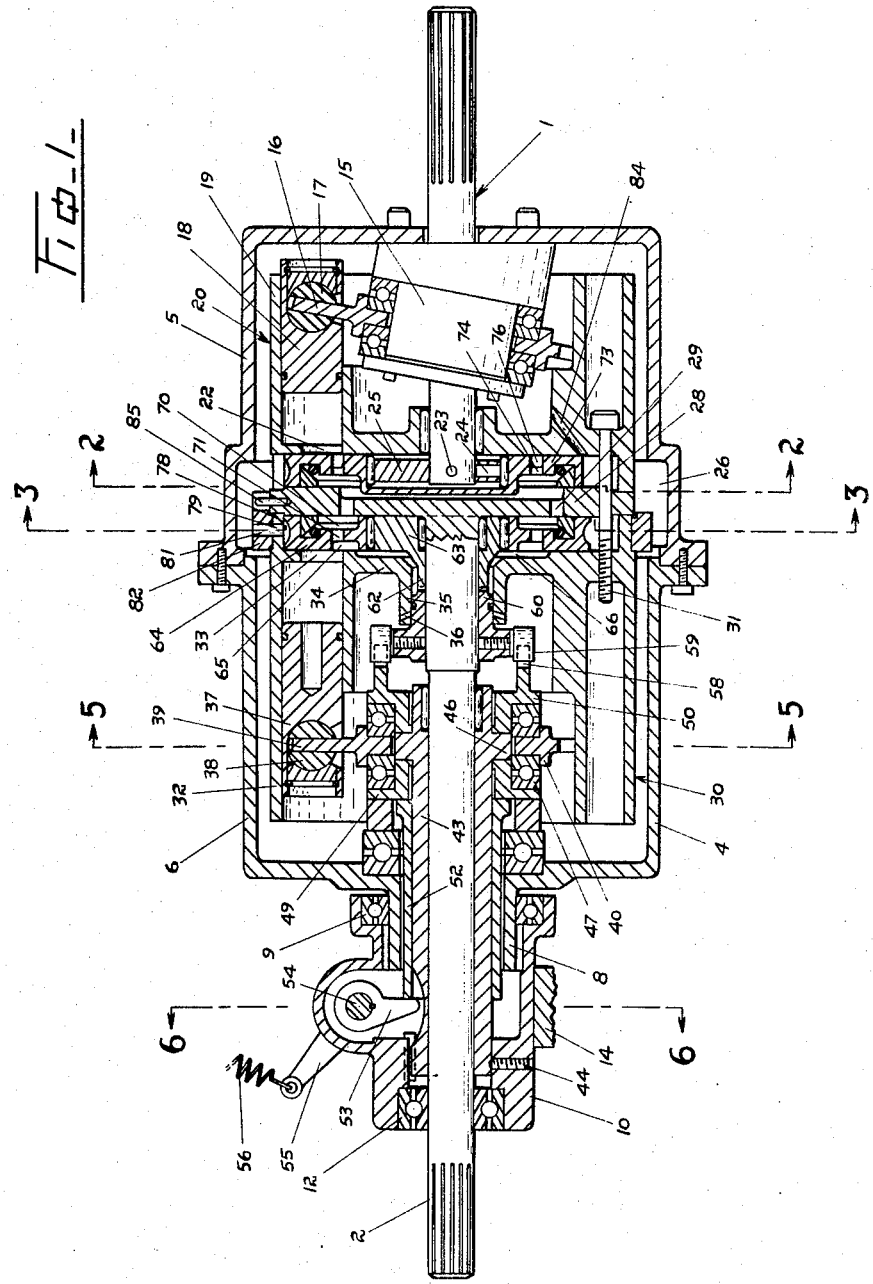
Figure 1 is a longitudinal section of the invention.

The input shaft 1 has concentrically connected to it a housing 4 divided into a pump casing 5 and a motor casing 6. The outer or left end of the casing 6, as seen in Figure 1, is provided with a hub 8 which is journaled in a bearing 9 carried in an end sleeve 10. The end sleeve 10 is journaled in a bearing 12 which is fitted upon the ouput or driven shaft 2 and is adapted to serve as an end support for the transmission and as such be fixedly carried on a frame member 14 of the vehicle.

Figure 2:
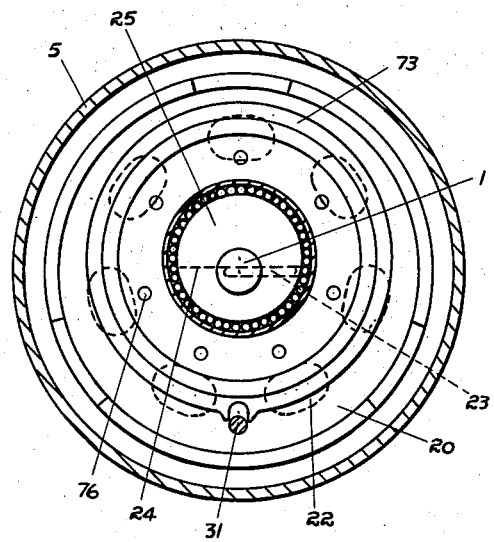
Figure 2 is a section taken on the line 2—2 of Figure 1.
Figure 8:
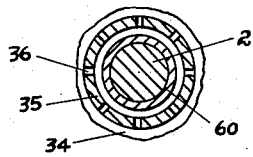
Figure 8 is a section taken substantially on the line 8—8 of Figure 7 with the pressure sleeve advanced as in neutral position.

Surrounding shaft 1 and rotatable therewith and also with the housing 4 is a wobble bearing 15 upon which a spider 16 having a plurality of spherical piston connectors 17 is rotatably mounted. In the present embodiment the angle of the bearing is 10 degrees from the axis of the shaft 1. The piston connectors 17 are each fitted in a pump piston 18 of an annular ring of cylinders 19 forming a pump cylinder block 20. Each cylinder 19 is provided with a port 22 in its end wall, see Figures 1 and 2. The inner end of the input shaft 1 is fitted with a radially extending pin 23 which rides in a peripheral slot 24 of an eccentric 25. The eccentric is adapted to be driven in alternate directions as will be more fully described. Surrounding the casing 5 adjacent the base of the cylinders 19 is an annular channel 26 which will hereinafter be referred to as a return flow passage. Aligned with the pump cylinder block 20 is a flange 28 having a plurality of apertures 29, which flange is integral with the inner end of the output or driven shaft 2. Also in alignment with the block 20 is a motor cylinder block 30. The pump cylinder block 20, the flange 28 and the motor cylinder block 30 are spaced apart as shown in Figure 1, but are coupled together to rotate as a unit by bolts 31, one only shown, with the driven shaft 2.

The motor cylinder block 30 is provided with a plurality of annularly disposed cylinders 32, one only shown, each of which has an end port 33. The block 30 is provided at its inner end with a flange 34 which carries a sleeve 35 which is provided with venting ports 36. Each of the cylinders 32 is fitted with a piston 37 which is adapted to be reciprocated with a ball connection 38, which ball connection is fitted on an arm 39 of a wobble spider 40.

Non-rotatably surrounding the driven shaft 2 is a trunnion sleeve 43 which is held against rotation by one or more set screws 44 extending into the stationary end sleeve 10. This sleeve is provided adjacent its inner end with a pair of opposed radial trunnions 46, see Figures 1, 5 and 7, and is recessed at its adjacent extremity to form a race for a set of roller bearings 47. Mounted upon the trunnions 46 of the trunnion sleeve 43 is a wobble bearing collar 49 made up of identical halves 50 and secured together by any suitable means, and journalled upon the collar 49 is the wobble spider 40 which engages the pistons 37 of the motor cylinders 32. Slidably mounted on the trunnion sleeve 43 is a control sleeve 52 which is adapted to be urged in an endwise direction to the right of Figure 1 by means of a crank lever 53 mounted on a transverse control shaft 54. The shaft 54 is fitted with an external operating lever 55 which is urged in an anti-clockwise direction by a coil spring 56, which lever may be coupled with the accelerator pedal of the vehicle, whereby as the accelerator pedal is depressed to increase the fuel supply to the engine, the collar 49 will tilt the spider 40. On the right hand end of the collar 49 a pair of inclined parallel cam slides 58, see details in Figure 7, are provided, which slides coact with rollers 59 extending from a pressure actuated sleeve 60, the said sleeve being slidable within the sleeve 35 of the motor cylinder block 30. The sleeve 60 terminates at its inner end in a sliding dog 61, see Figure 7, and coacts with a complementary dog 62 which is integral with an eccentric 63. Journalled on the eccentric 63 is a motor valve plate 64 which is provided with an annular groove 65 on the cylinder block side, which groove is in part always in communication with some of the ports 33 and the interspace 66 between the flange 34 and the eccentric 63. The groove 65 is also in communication with the interspace between the cylinders 32 when oil from said groove moves the sleeve 60 to uncover the venting ports 36 of the sleeve 35. The side of the plate 64 which is to the right of Figure 1 is provided with a relatively wide annular groove 70 which communicates with the groove 65 through ported passages 71.

Figure 3:
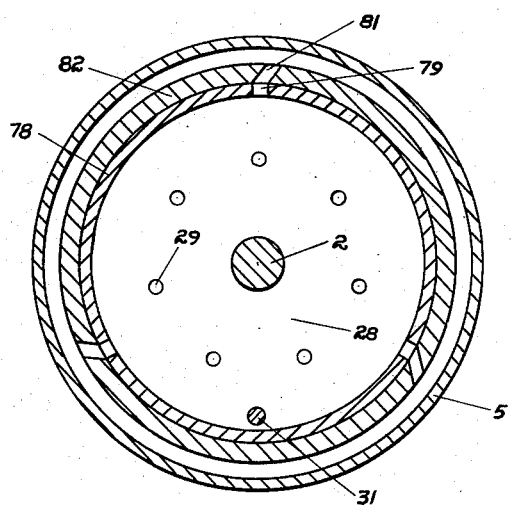
Figure 3 is a section taken on the line 3—3 of Figure 1.
Figure 4:
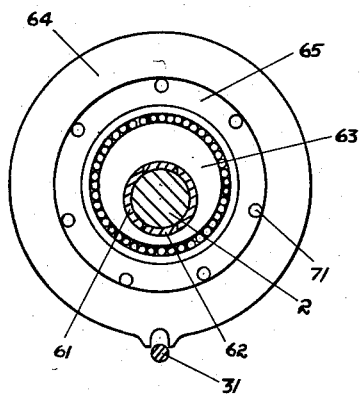
Figure 4 is an elevation of the left face of the motor valve plate as viewed in Figure 1 and showing the dog clutch and shaft in section.

Between the inner end of the pump cylinder block 20 and the apertured flange 28 is a pump valve plate 73, which rides on the eccentric 25 and is provided with a narrow annular face groove 74 which is adapted to move into register with the ports 22 and which is also in constant communication through ported passages 76 with the apertures 29 in the flange 28. The inner end of the motor cylinder block 30 is provided with a peripheral rim 78 having radial ports 79 which communicate with co-acting braking ports 81 in a short annular sleeve 82. The ports 81 are outwardly inclined as shown in Figure 3 in the direction counter to the normal rotation of the motor cylinder block 30 and communicate with the annular channel or return flow passage 26. The oil from the annular channel 26 may be vented back to the housing 4 by the valve plate 73 through vent ports 84.

The dog 62 engages the complementary sliding dog 61 to hold the sliding dog and the eccentric 63 non-rotative as a unit and this unit is held non-rotative with the control sleeve 52.

It will be observed that since the rollers 59 extend radially of the sleeve 60 and that the cam slides 58 are parallel to each other and engage said rollers, that endwise movement exerted on the sleeve 52 will not effect any rotational movement on the sleeve 60 and the sliding dogs 61, but will cause the wobble bearing collar 49 to rock upon the trunnions 46 and cause the spider 40 to tilt and rotate in a path which is oblique to the axis of the driven shaft 2.

Figure 9:
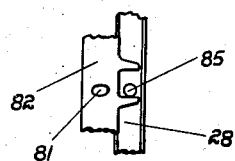
Figure 9 is a fragmentary view of a portion of the braking valve ring and its stop pin.

The annular sleeve 82 is limited in its circumferential travel to move the ports 79 and 81 relatively from full open to full closed position by a fork and pin means 85 as shown in Figure 9. By virtue of the angle of the ports 81 when oil is being forced outwardly through these ports, the sleeve 82 will be urged to move circumferentially in the direction of the normal flow of oil in the channel 26, or anticlockwise as viewed in Figure 3, but as said oil flow slows down, such as when decelerating or when the shaft 2 is striving to over-run shaft 1, then the drag or retarding effect of the oil will develop between the ports and cause a counter rotational movement tending to close the ports 79 and 81 relatively to each other and create a braking effect. When the shaft 2 is over-running the shaft 1 the sleeve 82 is being rotated at a greater speed than the speed of the annular body of oil within the channel 26 of the rotating housing 4. The oil thus exerts a drag or retarding effect upon the sleeve 82 which moves said sleeve relative to the rim 79 and disaligns the ports 79 and 81 to restrict the flow of oil therethrough during conditions of reverse power, which will be explained later.

The operation of the device as installed in a conventional automobile having an accelerator pedal would be as follows:

The housing 4 would be provided with hydraulic oil to substantially one-half of its capacity or to about the level of the aligned shafts 1 and 2 when the device is at rest. The vehicle engine is coupled to the input shaft 1 and the shaft 2 is directly coupled to the propeller or drive shaft of the vehicle. It has been stated that for automotive work a reversing gear train would be utilized, therefore the description of the device in transmitting a torque in one direction only is deemed to be sufficient. With the engine running at idling speed centrifugal force will hold the oil in an annular ring within the housing, submerging the pump and motor cylinders 19 and 32, respectively, and placing an endwise pressure on each of their pistons. Oil within the cylinders 32 will flow when the parts are in proper register from a cylinder 32 through or across the annular face groove 65 of the motor valve plate 64 into the space 66 to thrust the pressure actuated sleeve 60 to the left. This linear movement operates through the rollers 59 in the inclined cam slides 58 and rocks the wobble bearing collar 49 about the trunnions 46 and it also uncovers the venting ports 36, allowing the built up pressure upon the actuated sleeve 60 to be bled off through the center of the cylinder block 30 and back to the annular body of oil within the housing 4. The above setting will be "neutral" and no torque will be applied to the output shaft 2, see Figure 7. When the wobble spider 40 of the motor is in a plane normal or 90 degrees to the axis of the output shaft 2 no endwise movement of the motor pistons 37 can take place and no oil from the cylinders 32 can return to the pump cylinders 19, or can any of the pump pistons 18 move, hence the entire assembly of cylinder blocks will turn as a body and the motor valve plate 64 can rotate freely around its eccentric 63. When the accelerator is first depressed the control sleeve 52 is urged to the right by the crank lever 53, which reverses the action of the rollers 59 in the cam slides 58, thus causing the collar 49 to decrease its tilt in a clockwise direction, as indicated in Figure 7. In this figure the degree of tilt of the collar 49 is shown to give for no tilt, a one to one ratio; for 10 degrees a two to one ratio; for 18 degrees a three to one ratio, and for 20 degrees or maximum tilt no drive or neutral. If the load torque requirement drops the angle of tilt of the collar will move towards the zero or one to one ratio. During operation, oil is discharged from the end ports 33 of the motor cylinders 32 through the ports 79 of the peripheral rim 78 and the ports 81 of the short annular sleeve 82. Naturally when the angularity of the collar 49 is greatest relative to the shaft 2 the motor cylinders output will be high and the gear ratio low, but as the collar approaches the one to one ratio position the oil flow will cease to flow from said motor cylinders, consequently no piston movement can take place and the whole mechanism between the input shaft 1 and the output shaft 2 is locked. Under the above conditions the torque is transmitted through the pent up oil in the pump cylinders 19 to lock the spider 16 against rotational movement about the wobble bearing 15 and motion is transmitted to the output shaft 2. Normal oil flow through the mechanism thus ceases and heat generation in the oil stops, so that the transmission train can cool down at the time when in conventional hydraulic transmissions heat generation is at its greatest.

In a transmission of this kind a reverse power frequently develops where the output shaft 2 becomes a driving member and the input shaft 1 becomes the driven. Such a condition exists whenever the engine is decelerated running down hill or when it is required to start the vehicle engine by means of pulling of pushing the said vehicle. Braking effect is obtained when the engine is rapidly decelerating, but it is not possible or desirable for the hydraulic motor to drive the input shaft 1 faster than the output shaft 2. When reverse power exists, the output shaft 2 turns ahead of the input shaft 1, though both are turning in the same direction. At this time it is desired that the pump supply oil to the motor in the normal way by means of pump piston 18 movement and that the pump valve plate 73 be changed in phase, so that the inward stroke of the piston 18 will deliver oil to the inside of the valve plate and the outward stroke of the pistons will draw oil from the annular space 26. To accomplish this change the disposition of the eccentric 25 has been changed relative to the projection of the pin 23 upon the input shaft 1. In the position shown in Figure 1 the pin 23 engages one end of the slot 24 in the eccentric and when the change is made from normal power to reverse power the pin moves to the opposite end of said slot, thus reversing the position of the eccentric 25 relative to the shaft 1. In other words the eccentric 25 which is carried in the valve plate 73 is now being rotated at a greater speed than the shaft 1 since said plate, the pump and motor cylinders, the plate 64 and the output shaft all rotate as a unit. It is this over-running of the input shaft by the eccentric which causes the pin 23 to swing in the slot 24. In the above position the pump delivers to the motor, instead of receiving from the motor, a quantity of oil determined by angularity of the wobble bearing 49. The motor then discharges through the restricted ports 81 in the sleeve 82 and corresponding ports 79 in the cylinder rim 78.

What I claim as my invention is:

1. A hydraulic transmission having aligned input and output shafts, a housing concentric with the shafts, said housing being secured to the input shaft to rotate therewith and being journaled about the output shaft, said housing forming a reservoir for hydraulic fluid, an annular ring of pump cylinders directly coupled with a similar annular ring of motor cylinders, said rings of cylinders being rotatively mounted on said output shaft, a set of pistons for each of the cylinders of a ring, a wobble bearing carried by the housing, a spider operatively connected with the pistons of the pump cylinders, said spider being rotatable about the wobble bearing as the cylinders rotate relative to the input shaft, a non-rotatable trunnion sleeve surrounding the output shaft, a bearing collar rockable upon the trunnion sleeve, a second spider rotatable upon the bearing collar and operatively engaging the pistons of the motor cylinders, a pressure actuated sleeve slidable upon the output shaft and operatively engaging the bearing collar, a control sleeve slidable upon the trunnion sleeve, said pressure actuated sleeve being movable in response to fluid pressure to rock the bearing collar in one direction, manually operable means for imparting endwise movement to the control sleeve to rock the bearing collar in the opposite direction and valve plate means for feeding fluid from the pump cylinders to the motor cylinders.

2. A hydraulic transmission having aligned input and output shafts, a housing concentric with the shafts, said housing being secured to the input shaft to rotate herewith and being journaled about the output shaft, said housing forming a reservoir for hydraulic fluid, an annular ring of pump cylinders directly coupled with a similar annular ring of motor cylinders, said rings of cylinders being rotatively mounted on said output shaft, a set of pistons for each of the cylinders of a ring, a wobble bearing carried by the housing, a spider operatively connected with the pistons of the pump cylinders, said spider being rotatable about the wobble bearing as the cylinders rotate relative to the input shaft, a non-rotatable trunnion sleeve surrounding the output shaft, a bearing collar rockable upon the trunnion sleeve, a second spider rotatable upon the bearing collar operatively engaging the pistons of the motor cylinders, a pressure actuated sleeve slidable upon the output shaft and operatively engaging the bearing collar to rock it and the second spider in one direction and a manually operable control sleeve slidable upon the trunnion sleeve and engaging the opposite end of the bearing collar to rock it in the opposite direction, a first valve plate interposed in an interspace and having ported passages communicating with the inner ends of the pump cylinders and a second valve plate interposed in an interspace and having ported passages communicating with the inner ends of the motor cylinders, said first valve plate being moved by eccentric means from the input shaft and said second valve plate being moved by eccentric means from the output shaft.

3. A hydraulic transmission as claimed in claim 1 wherein the control sleeve is moved to dispose the bearing collar in a position normal to the output shaft and the pressure actuated sleeve is moved to tilt the bearing collar at an angle to the output shaft and reduce the speed of the output shaft relative to that of the input shaft.

4. A hydraulic transmission as claimed in claim 2, wherein the second valve plate serves to direct hydraulic oil from the motor cylinders to the reservoir space when the speed of rotation of the output shaft is being reduced a predetermined extent relative to that of the input shaft.

5. A hydraulic transmission as claimed in claim 2, wherein an annular channel is provided in the housing, said motor valve plate being enclosed by a peripheral rim formed integrally with the motor cylinders, said rim having normally open vent ports through which fluid flows from the motor cylinders to the annular channel.

6. A hydraulic transmission as claimed in claim 2, wherein an annular channel is provided in the housing, said motor valve plate being enclosed by a peripheral rim extending from the motor cylinders, said peripheral rim having ports, an annular sleeve having limited rocking movement upon the peripheral rim, said annular sleeve having coacting ports to restrict the oil flow through the ports of the peripheral rim from the motor cylinders to the annular channel.

7. A hydraulic transmission as claimed in claim 2, wherein an annular-channel is provided in the housing, said pump cylinder annulus having a peripheral rim provided with vent ports through which hydraulic fluid is vented back to the annular passage an annular sleeve rotatable about the peripheral rim of the motor cylinder annulus, said annular sleeve having coacting ports to restrict the oil flow throuh the ports of the peripheral rim from the motor cylinder to the annular passage, said annular sleeve being moved in response to the drag of the fluid within the annular chamber to dispose its ports substantially out of registration with the ports of the peripheral rim.

8. A hydraulic transmission as claimed in claim 2, wherein the input shaft eccentric is rockable upon said shaft and has a slot extending around substantially one hundred and eighty degrees of its circumference, said input shaft having a radial projection slidably received in said slot, said radial projection engaging one end of the slot to rotate the eccentric when the speed of the input shaft exceeds that of the output shaft and being engaged by the opposite end of the slot when the speed of the output shaft exceeds that of the input shaft.

9. A hydraulic transmission as claimed in claim 1, wherein the operative connection between the pressure actuated sleeve and the bearing collar is formed by a pair of rollers which extend radially from the pressure actuated sleeve and are engaged by a pair of coacting guides which extend obliquely from the adjacent face of the bearing collar.

References Cited in the file of this patent

UNITED STATES PATENTS

| 1,726,454 | Rayburn et al. | Aug. 27, 1929 |
| 1,840,872 | Rayburn | Jan. 12, 1932 |
| 2,199,081 | Perin | Apr. 30, 1940 |
| 2,360,025 | Wahlmark | Oct. 10, 1944 |
| 2,633,104 | Lauck et al. | Mar. 31, 1953 |
| 2,792,814 | Christophel | May 21, 1957 |

FOREIGN PATENTS

| 23,390 | Australia | July 6, 1935 |